(12) United States Patent
Seppinen et al.

(10) Patent No.: US 7,203,472 B2
(45) Date of Patent: Apr. 10, 2007

(54) METHOD AND APPARATUS PROVIDING CALIBRATION TECHNIQUE FOR RF PERFORMANCE TUNING

(75) Inventors: Pauli Seppinen, Espoo (FI); Aarno Parssinen, Esppo (FI); Mikael Gustafsson, Porvoo (FI); Mika Makitalo, Esppo (FI)

(73) Assignee: Nokia Corporation, Espoo (FI)

( * ) Notice: Subject to any disclaimer, the term of this patent is extended or adjusted under 35 U.S.C. 154(b) by 655 days.

(21) Appl. No.: 10/099,626

(22) Filed: Mar. 15, 2002

(65) Prior Publication Data

US 2003/0176174 A1 Sep. 18, 2003

(51) Int. Cl.
*H04B 17/00* (2006.01)
*H04B 1/28* (2006.01)

(52) U.S. Cl. ............... 455/226.1; 455/227; 455/234.2; 455/313; 455/326; 375/224

(58) Field of Classification Search ............. 455/226.1, 455/67.4, 12.1, 427, 67.1, 67.7, 226.2, 226.3, 455/226.4, 232.1, 326, 313, 302, 227, 234.2, 455/236.1, 237.1, 284, 204–205, 130, 502, 455/67.11, 67.13, 67.14; 375/224–226, 211–216, 375/345, 327, 346, 343; 330/2, 129
See application file for complete search history.

(56) References Cited

U.S. PATENT DOCUMENTS

| | | | | |
|---|---|---|---|---|
| 5,584,049 A | * | 12/1996 | Weaver et al. | 455/67.11 |
| 5,949,372 A | * | 9/1999 | Lennen | 342/357.02 |
| 6,118,881 A | | 9/2000 | Quinlan et al. | 375/219 |
| 6,151,354 A | | 11/2000 | Abbey | 375/211 |
| 6,201,953 B1 | * | 3/2001 | Dwyer | 455/226.1 |
| 6,225,848 B1 | * | 5/2001 | Tilley et al. | 327/307 |
| 6,262,625 B1 | * | 7/2001 | Perner et al. | 330/2 |
| 6,321,068 B1 | | 11/2001 | Zamat | 455/69 |

(Continued)

FOREIGN PATENT DOCUMENTS

| | | |
|---|---|---|
| EP | 0 557 800 A1 | 9/1993 |
| WO | WO 01/26259 A1 | 4/2001 |

OTHER PUBLICATIONS

Macedo et al., "A 1.9-GHz Silicon Receiver with Monlithic Image Filtering", IEEE J. Solid-State Circuits, vol. 33, pp. 378-386, Mar. 1998.

(Continued)

*Primary Examiner*—Pablo N. Tran
(74) *Attorney, Agent, or Firm*—Harrington & Smith, LLP

(57) ABSTRACT

A method is disclosed for operating a RF receiver of a communications equipment, as is circuitry for implementing the method. The method includes, while operating under the control of a data processor of the communications equipment, generating a calibration signal; injecting the calibration signal into a low noise amplifier (LNA) of the RF receiver; measuring a downconverted response of the receiver at a plurality of different frequencies of the calibration signal, or measuring the downconverted response of the receiver at a plurality of different LNA tuning combinations using a fixed calibration frequency, and at least one of tuning a resonance frequency of at least one LNA resonator based on the measured downconverted response so as to compensate at least for variations in component values that comprise the at least one resonator, or adjusting the linearity of the receiver.

48 Claims, 12 Drawing Sheets

U.S. PATENT DOCUMENTS

| | | | |
|---|---|---|---|
| 6,498,582 B1 | 12/2002 | Sweeney et al. | 342/149 |
| 6,498,927 B2 | 12/2002 | Kang et al. | 455/245.2 |
| 6,512,803 B2 | 1/2003 | Heinzi et al. | 375/350 |
| 6,603,810 B1* | 8/2003 | Bednekoff et al. | 375/228 |
| 6,704,352 B1* | 3/2004 | Johnson | 375/224 |
| 6,897,729 B1* | 5/2005 | Jin et al. | 330/296 |
| 2003/0153289 A1* | 8/2003 | Hughes et al. | 455/138 |
| 2003/0214423 A1* | 11/2003 | Lee et al. | 341/118 |
| 2003/0231723 A1* | 12/2003 | Hansen | 375/343 |
| 2004/0002318 A1* | 1/2004 | Kerth et al. | 455/302 |
| 2004/0137870 A1* | 7/2004 | Kivekas et al. | 455/326 |
| 2005/0069056 A1* | 3/2005 | Willingham | 375/327 |
| 2005/0070239 A1* | 3/2005 | Paulus | 455/205 |
| 2005/0073357 A1* | 4/2005 | Carpineto et al. | 330/2 |
| 2006/0001559 A1* | 1/2006 | Tuttle et al. | 341/120 |
| 2006/0009180 A1* | 1/2006 | Xu et al. | 455/226.1 |

OTHER PUBLICATIONS

Samavati et al., "A 5-GHz CMOS Wireless LAN Receiver Front End", IEEE J. Solid-State Circuits, vol. 35, pp. 765-772, Mar. 2000.

* cited by examiner

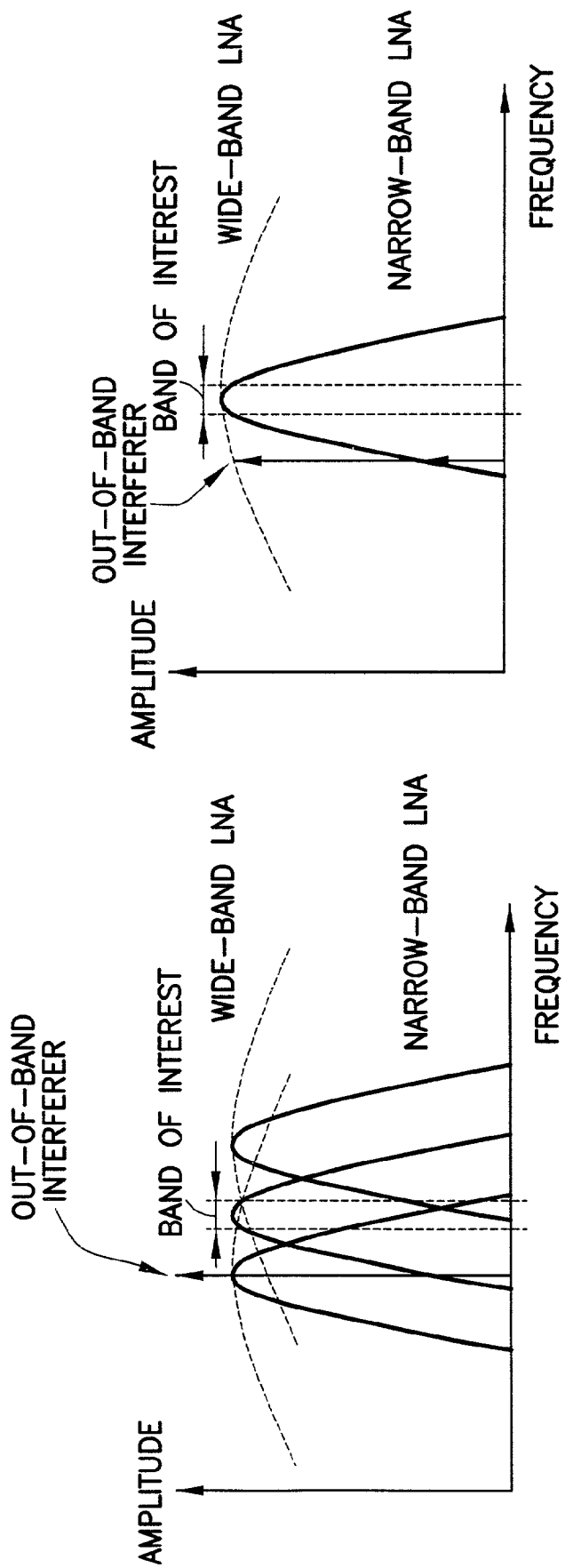

METHOD AND APPARATUS PROVIDING CALIBRATION TECHNIQUE FOR RF PERFORMANCE TUNING

TECHNICAL FIELD

These teachings relate generally to radio frequency (RF) receivers and, more specifically, relate to methods and apparatus for optimizing the performance of receivers such as those found in cellular telephones and other types of mobile communication devices and terminals.

BACKGROUND

The following abbreviations are herewith defined.

| | |
|---|---|
| ADC | analog-to-digital converter |
| AM | amplitude modulation |
| ASIC | application specific integrated circuit |
| BB | baseband |
| CDMA | code division multiple access |
| CMRR | common-mode-rejection ratio |
| CPU | central processing unit |
| DS-CDMA | direct sequence CDMA |
| DSP | digital signal processing |
| FDD | frequency division duplexing |
| FM | frequency modulation |
| FPGA | field programmable gate array |
| IC | integrated circuit |
| ICP | input compression point |
| IF | intermediate frequency |
| IIP2 | second-order input intercept point |
| IIP3 | third-order input intercept point |
| IMD2 | second-order intermodulation product |
| IMD3 | third-order intermodulation product |
| LNA | low noise amplifier |
| LO | local oscillator |
| PM | phase modulation |
| PD | phase detector |
| PDF | phase-frequency detector |
| RX | receiver |
| RF | radio frequency |
| RSSI | received signal strength indicator |
| TX | transmitter |
| VCO | voltage controlled oscillator |
| WCDMA | wide-band CDMA |
| 3G | third-generation (cellular system) |

As is well known, passive components that are used in RF ICs typically have relatively large process variations. This leads to a direct trade-off between the accuracy of the resonant or resonance frequency and the bandwidth of the circuit. As a result it is common practice to use relatively low-Q resonators in the RF signal path in order to ensure a sufficiently wide bandwidth and, thus, sufficient performance without requiring calibration. Additionally, calibrations performed during fabrication are preferably avoided in order to reduce cost. The use of a narrow bandwidth (narrow band) LNA in the RF receiver enables the elimination of a bandpass filter after the LNA, and thus reduces cost. Since the passive component process variations can be large, however, some calibration is normally needed, and the cost savings may not be as great as one would at first expect.

As such, what is required is a simple implementation of a calibration technique that can be used to tune resonators in analog circuits, as well as a technique to utilize (relatively) narrow-band resonators in a radio system.

In most applications a relatively wide-band LNA is used, which is insensitive to process variations, and if necessary an external filter is placed between the LNA and a downstream mixer in order to reduce transmitter leakage (an undesired signal coupled into the receiver from the transmitter). In addition, some structures that use additional resonators in the LNA-mixer interface, or in the LNA topology itself have been presented. Reference in this regard can be made to J. A. Macedo, M. A. Copeland, "A 1.9-GHz Silicon Receiver with Monolithic Image Filtering", IEEE J. Solid-State Circuits, vol. 33, pp. 378–386, March 1998, as well as to H. Samavati, H. R. Rategh, T. H. Lee, "A 5-GHz CMOS Wireless LAN Receiver Front End", IEEE J. Solid-State Circuits, vol.35, pp.765–772, March 2000. While primarily intended for image rejection purposes, the problems associated with filtering out-of-band signal components are basically the same as when filtering transmitter leakage. However, although the LNA structure with two resonators has been described in the prior art, an adequate solution to the calibration and optimal scaling with current of the two resonator LNA has not previously been proposed.

FIG. 1 shows a conventional direct conversion receiver 1. After the antenna 2 the desired radio band (e.g., WCDMA/GSM/or other) is selected using a bandpass filter 3 in front of the first (variable) amplifying stage 4. The signal is then downconverted with mixers 5 to a zero IF (i.e. direct conversion) using quadrature local oscillator (LO) signals 6 (in 90 degree phase shift) that are tuned with a synthesizer 7 at the carrier frequency of the received channel. After downconversion the signal is applied to baseband amplifiers 8, 10 and filters 9, and in a digital communications systems the information is converted into digital form with an analog-to-digital converter (A/D) 11 and further then digitally filtered 12. Channel decoding 13 and other necessary digital functions to recover the transmitted information are be performed after the A/D 11. Gain control is an important function to extend the input signal range in all receiver architectures, and is used as well in the instant invention to adjust signal levels during calibration. An RSSI block 14 provides a signal to a gain control logic block 15 that functions to adjust the gain of the amplifiers 4, 8 and 10 to maintain the received signal at a desired level.

FIG. 2A shows the construction of a typical low noise amplifier (LNA) that is used as the first amplifier 4 in the receiver chain, while FIG. 2B shows a typical voltage controlled oscillator (VCO) 7A used in the synthesizer 7. The VCO 7A generates the high-frequency signal from which the quadrature LO signals are generated. Both of these devices use a resonator that can be implemented on the RF IC or with an external tank circuit. Although the resonators in FIGS. 2A and 2B appear slightly different, they perform electrically exactly the same resonance function. Generally, for the purposes of this invention all described resonators can be considered to be an LC tank circuit containing an inductor, a capacitor and a resistor. The resistor is not necessarily shown in all drawings, and in most cases the resistor is actually the parasitic resistance, which degrades the quality of the tank circuit in all physical realizations, and hence must be taken into account.

However, a wide-band LNA can be implemented according to FIG. 2A using a high-quality LC tank and a parallel separate resistor R to enhance the bandwidth by lowering the quality factor (Q value) of the tank circuit. This technique is generally used in many LNA implementations, as the current IC technologies provide inductors and capacitors that produce too high a Q value for the tank circuit, if process variations are taken into account. This problem is illustrated in FIG. 3A. Due to process variations the center frequency can vary by too large an amount between samples in order to cover the entire band of interest (i.e., bandwidth of the system) without requiring tuning (calibration). Therefore, tuning is required in the case of a narrow-band LNA. In the case of a wide-band structure (shown by the dashed lines), the process variations have a much smaller effect on the amplification in the band of interest. The difference between the two approaches in attenuating the out-of-band interferer, such as the transmitter leakage, is shown in FIG. 3B. The benefit of using a narrow-band LNA is obvious, and even relatively small improvements in the attenuation can relax the receiver specifications significantly.

In making system calculations it can be shown that 6 dB attenuation in the maximum transmitter (TX) power leakage at some distance (in MHz) from the desired signal can relax the mixer 5 specification sufficiently so as to remove a filter from the LNA-mixer interface. The intermodulation of the TX leakage with an unwanted spurious signal is considered in this estimation. While a resonance circuit with sufficient performance can be implemented using current IC technologies, the accuracy of the resonant frequency is not acceptable without tuning. However, and as was described above, the requirement to provide tuning increases the cost, and is thus not desirable.

SUMMARY OF THE PREFERRED EMBODIMENTS

The foregoing and other problems are overcome, and other advantages are realized, in accordance with the presently preferred embodiments of these teachings.

This invention describes an apparatus, a method and an algorithm for providing a calibration technique that allows for the use of narrow bandwidth resonators in the RF signal path and thus reduces the linearity requirements of those circuit blocks that benefit from additional attenuation of the out-of-band interferers. The presently preferred calibration technique also allows the enhancement of linearity performance with certain tuning techniques, without increasing the power consumption. Because in most cases the linearity requirement dominates the power consumption, the calibration technique preserves the same linearity performance with a reduced current consumption, and thus contributes to reducing the overall power consumption in the system. Another important benefit realized by the presently preferred calibration technique is that when certain performance parameters are relaxed after frequency band limitation, it becomes possible to eliminate external filtering while achieving sufficient performance with on-chip devices. One important application for this technique is in the removal of external band selection filtering located between the LNA and the downconversion mixers, which are typically required due to the leakage of the transmitter power into the receiver input in full duplex systems having a simultaneous transmission and reception mode. The 3G CDMA systems are particular examples of such full duplex systems.

In accordance with this invention logic is provided that changes the LNA resonator and detects the strongest response, as well as an algorithm that selects the resonance frequency based on the strongest response and that can shift the resonance from the nominal according to the current LO signal. The invention also provides a method to shift the resonance according to a current scaling of the LNA. The invention also provides an additional oscillator mode in which the output signal is amplitude and/or frequency modulated. The invention also provides an algorithm that tunes the linearity performance of the receiver to a maximum by using the signals, produced by the additional oscillator or LO synthesizer and modulator, and measures the results at baseband. The invention beneficially provides a tuning method for a narrow-band LNA structure using two resonators, and an additional oscillator that uses the LNA resonator in a calibration mode, preferably in combination with a phase lock loop.

In accordance with the teachings of this invention an additional high frequency signal with desired properties is connected to the LNA resonance circuit and the input stage of the LNA is switched off. By tuning the resonance frequency (and possibly the LO frequency) the maximum output signal level of the RF front-end of the receiver is detected. This maximum level indicates that the resonance of the LNA is approximately the same as with the known LO frequency. With this setting the resonance is brought closer to the band of interest and any process variations that affect the resonance frequency are thereby compensated. By using this calibration procedure a relatively narrow bandwidth LNA can be employed in the receiver to filter out the out-of-band interferes, such as the own-transmitter leakage power when operating in the full duplex mode.

The calibrated LNA resonance may also be tuned during reception based on the synthesizer frequency to which the receiver is to be tuned. In that the transmitted signal in the case of full duplex communication is located typically at a fixed separation in frequency as compared to the reception, the gain of the LNA with respect to the TX attenuation can be optimized for all frequency channels separately if the resonance of the LNA can be shifted according to the received radio channel. This property is beneficial in, for example, the full duplex 3G WCDMA system.

The resonance frequency may also change slightly if the LNA biasing current varies. However, because the process variations of the resonator are calibrated for by the use of this invention, the known frequency shift as a function of the biasing current can be also taken into account when the bias of the LNA is changed.

A narrow-band LNA can be established using a high-quality tank circuit in the resonator load. However, current IC technologies do not provide very high Q-values for the inductors using standard processing steps, and thus restrict the bandwidth limitation capabilities of the LNA. To circumvent this problem an LNA structure that uses two resonators is employed in order to reduce the LNA bandwidth, and in accordance with an aspect of this invention, a procedure is provided for tuning the two resonators during calibration and during operation of the LNA/receiver.

In order to maximize the linearity of the receiver, the calibration signal can be amplitude or frequency modulated. The amplitude modulated (AM) signal can be used for IIP2 tuning in the receiver while the frequency modulated (FM) signal can be used for IIP3 tuning.

This invention thus provides circuitry and a method to generate suitable test signals for enabling internal receiver tuning, to detect the results and to perform an internal calibration cycle in the radio receiver to achieve an optimum level of performance.

The calibration is preferably performed during idle time slots in a TDMA communications system, such as GSM, and/or during the start up of the mobile station, and/or during any other available idle time in any other radio system. Because the calibrations performed are related mainly to characterizing component process variations, they may be performed only once. However, the calibration can be performed as often as desired, so long as the LNA of the receiver can be switched off or at least partially disabled from operation. For example, the calibration procedure can be performed in a multi-mode or multi-band receiver when the particular receiver front-end is not in use.

One important benefit that is derived from the use of the teachings of this invention is that it becomes possible to use a relatively narrow-band LNA in the radio receiver, and to then perform the calibration internally to the RF IC. The narrow-band LNA attenuates more effectively the out-of-band interferers, which enables the linearity requirements of the receiver blocks following the LNA, as well as the LNA itself, to be relaxed. This has particular significance in the fall duplex case where reception occurs simultaneously with transmission, and where the transmitter power leaks into the receiver input. In that linearity performance requirements typically dominate the receiver power consumption, by relaxing the linearity performance requirements, the average power consumption can be reduced significantly.

Another important benefit that is derived from the use of the teachings of this invention is that due to the large leaked transmitter power an external filter is typically needed between the output of the LNA and input to the mixer, even in the direct conversion receiver, otherwise the mixer linearity requirements become unreasonable. However, by enabling the use of a narrow band LNA, in combination with the calibration procedure therefor, the large and expensive external filter can be eliminated, and the linearity requirements of the mixer can be relaxed as well. This results in both cost and power consumption savings.

The use of this invention also provides the possibility to employ the same oscillator used in the resonance calibration for tuning the IIP2 of the receiver by a simple amplitude modulation method in the oscillator. In this case there is potentially no need to calibrate the IIP2 during fabrication. The IIP3 can also be maximized by correctly biasing or switching certain structures. This invention provides an opportunity to tune or calibrate IIP3 performance internally in order to optimize the circuit performance. In general, the internal optimization of IIP3 can lead to reduced power consumption. A two-tone test signal for the IIP3 optimization can be generated either internally or externally.

This invention provides a RF receiver of a communications equipment, such as a mobile station or a base station, that has calibration circuitry that operates under the control of a data processor of the communications equipment for use in calibrating RF circuitry of the communications equipment in the field, as opposed to only calibrating the circuitry in a factory in a production and/or testing environment. Furthermore, all of the disclosed calibrations can also be performed during production. In this case no external test signals are required to be connected to the device under test, leading to simplifications and increased efficiencies during the fabrication test cycle.

A method is disclosed for operating a RF receiver of a communications equipment, as is circuitry for implementing the method. The method includes, while operating under the control of a data processor of the communications equipment, generating a calibration signal; injecting the calibration signal into a low noise amplifier (LNA) of the RF receiver; measuring a downconverted response of the receiver at a plurality of different internal states of the receiver using the calibration signal at more than one frequency, or measuring the downconverted response of the receiver at a plurality of different LNA tuning combinations using a fixed calibration frequency, and at least one of tuning a resonance frequency of at least one LNA resonator based on the measured downconverted response so as to compensate at least for variations in component values that comprise the at least one resonator, or adjusting the linearity of the receiver.

The receiver internal states are preferably those associated with an adaptive receiver wherein receiver internal blocks including, but not limited to, the bias current(s), gain(s) and linearity can be tuned or adjusted, resulting in some state or performance of the receiver.

In a further aspect this invention operates a mobile station data processor, during a time that a receiver is not required, for at least partially disabling a receiver low noise amplifier, for generating a calibration signal within the mobile station and coupling the calibration signal into the receiver, measuring a downconverted response of the receiver to the calibration signal, and at least one of tuning a resonance frequency of at least one LNA resonator based on the measured downconverted response, or adjusting the linearity of the receiver chain.

In another aspect this invention operates a mobile station data processor, during a time that a receiver is required, for at least partially enabling the receiver low noise amplifier, for generating the calibration signal within the mobile station and coupling the calibration signal into the receiver, measuring a downconverted response of the receiver to the calibration signal, and at least one of tuning a resonance frequency of at least one LNA resonator based on the measured downconverted response, or adjusting the linearity of the receiver chain.

The downconverted calibration signal is preferably located outside of a receiver passband transfer function so that the calibration signal is not totally rejected, and preferably the downconverted calibration signal is separated from the received signal spectrum by bandpass filtering in the digital domain.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIGS. 3A and 3B, collectively referred to as FIG. 3, are graphs wherein FIG. 3A shows the effect of process variations on a narrow bandwidth LNA, contrasted with a wide bandwidth LNA; and FIG. 3B shows the effect of the narrow band LNA on the attenuation of an out-of-band interferer, such as leaked transmitter power;

DETAILED DESCRIPTION OF THE PREFERRED EMBODIMENTS

Figure 14:
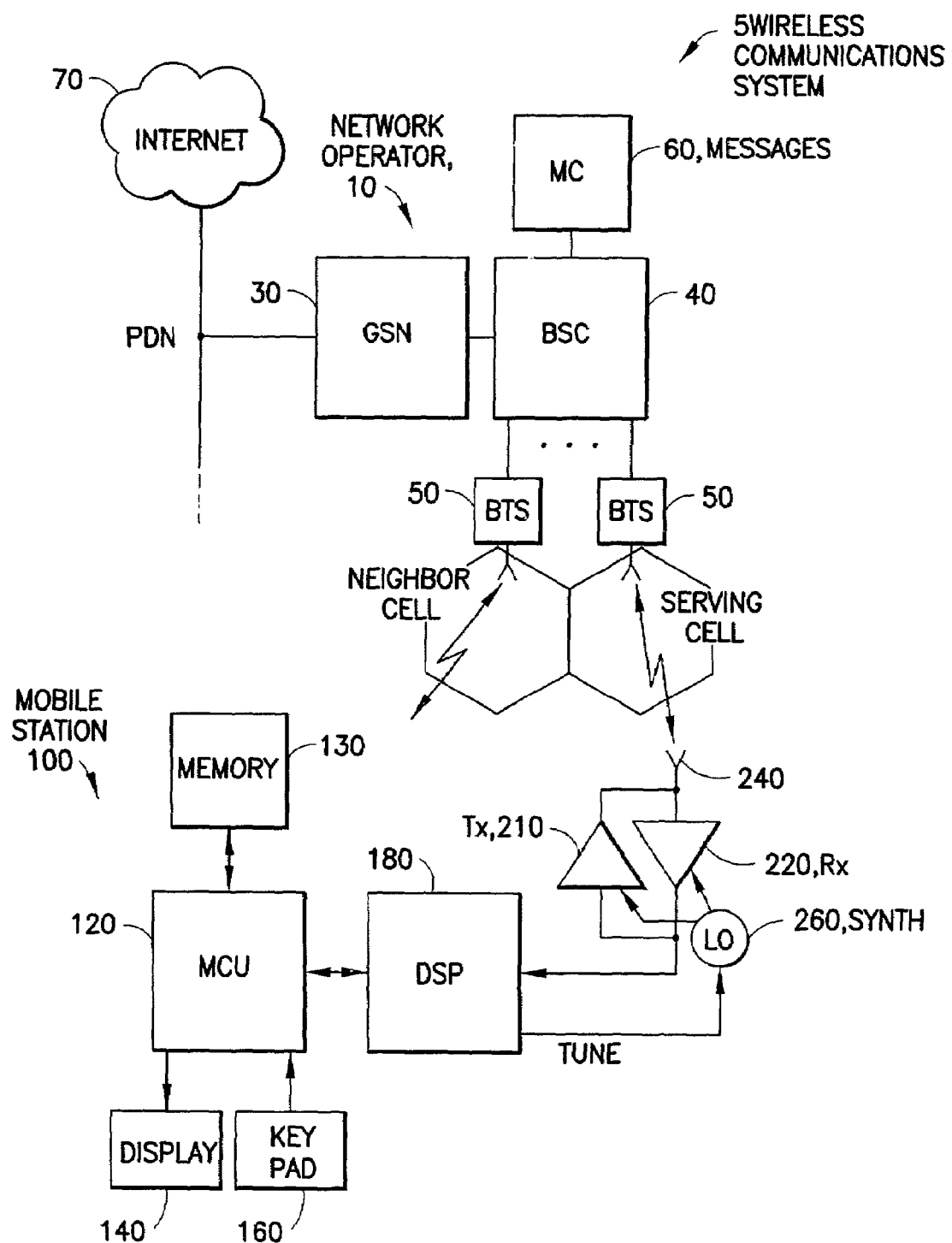
FIG. 14 is a block diagram of a wireless communications system that includes a mobile station with a direct conversion receiver that is operated in accordance with this invention.

In order to place this invention into a suitable technological context, reference is first made to FIG. 14 where there is illustrated a simplified block diagram of an embodiment of a wireless communications system that includes at least one mobile station (MS) 100 that is suitable for practicing this invention. FIG. 14 also shows an exemplary network operator having, for example, a GPRS Support Node (GSN) 30 for connecting to a telecommunications network, such as a Public Packet Data Network or PDN, at least one base station controller (BSC) 40, and a plurality of base transceiver stations (BTS) 50 that transmit in a forward or downlink direction both physical and logical channels to the mobile station 100 in accordance with a predetermined air interface standard. Each BTS 50 is assumed to support a cell. A reverse or uplink communication path also exists from the mobile station 100 to the network operator, which conveys mobile originated access requests and traffic.

The air interface standard can conform to any suitable standard or protocol, and may enable both voice and data traffic, such as data traffic enabling Internet 70 access and web page downloads. One suitable type of air interface is based on TDMA and may support a GSM or an advanced GSM protocol, although these teachings are not intended to be limited to TDMA or to GSM or GSM-related wireless systems. In fact, another wireless system and air interface, such as a WCDMA system, may serve at least a part of the geographical area served by the wireless communication system shown in FIG. 4, and the MS 100 may be a multi-band terminal that is capable of operating with either the GSM or the WCDMA network, or it may be a single-band terminal that operates only with the WCDMA system.

The network operator may also include a suitable type of Message Center (MC) 60 that receives and forwards messages for the mobile stations 100. Other types of messaging service may include Supplementary Data Services and one under currently development and known as Multimedia Messaging Service (MMS), wherein image messages, video messages, audio messages, text messages, executables and the like, and combinations thereof, can be transferred between the network and the mobile station 100.

The mobile station 100 typically includes a microcontrol unit (MCU) 120 having an output coupled to an input of a display 140 and an input coupled to an output of a keyboard or keypad 160. The mobile station 100 may be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a read-only memory (ROM) for storing an operating program, as well as a random access memory (RAM) for temporarily storing required data, scratchpad memory, received packet data, packet data to be transmitted, and the like. A separate, removable SIM (not shown) can be provided as well, the SIM storing, for example, a preferred Public Land Mobile Network (PLMN) list and other subscriber-related information. The ROM is assumed, for the purposes of this invention, to store a program enabling the MCU 120 to execute the software routines, layers and protocols required to operate in the wireless communications system, as well as to provide a suitable user interface (UI), via display 140 and keypad 160, with a user. The stored program also is operable for executing the methods and algorithms in accordance with these teachings, such as and including the methods illustrated in FIGS. 7 and 10. Although not shown, a microphone and speaker are typically provided for enabling the user to conduct voice calls in a conventional manner.

The mobile station 100 also contains a wireless section that includes a digital signal processor (DSP) 180, or equivalent high speed processor or logic or control unit, as well as a wireless transceiver that includes a transmitter (Tx) 200 and a receiver (Rx) 220, both of which are coupled to an antenna 240 for communication with the network operator via the BTS 50. At least one local oscillator (LO) 260 forms a part of a frequency synthesizer and is provided for tuning the transceiver. Data, such as digitized voice and packet data, is transmitted and received through the antenna 240.

Of most interest to the teachings of this invention is the receiver 220. The receiver 220 is assumed to be a direct conversion receiver, although in other embodiments other types of receivers, such as superheterodyne receivers, could be employed, and to include calibration functions in accordance with this invention, as will now be described in further detail.

This invention allows the use of a narrow-band LNA 4 in the radio receiver 220 by providing a convenient mechanism and method to calibrate the LNA. The calibration method can be done using an internal calibration procedure. While some calibration typically is performed after RF IC fabrication, the use of this invention can eliminate the requirement to provide external test signals and/or equipment during mobile station production. The calibration can also be performed later if desired, during idle operation modes and possibly during reception as well. Additionally, the calibration does not require another switch to connect the calibration signal to the LNA 4.

For the purposes of this invention a wide bandwidth LNA 4 is one that is suitable for operation over a wide frequency bandwidth, whereas a narrow bandwidth resonator will typically have a higher Q value than the wide bandwidth resonator.

The same circuitry can be used also to tune the linearity of the receiver 220 by modulating the LO/auxiliary VCO signal. This permits as well the tuning of IIP2 without requiring external test signals, and also provides a technique to optimize IIP3.

While the calibration procedure consumes some amount of power during calibration, because the calibration needs to be performed either only once or at most infrequently, the increment in the average power consumption is negligible.

Figure 4:
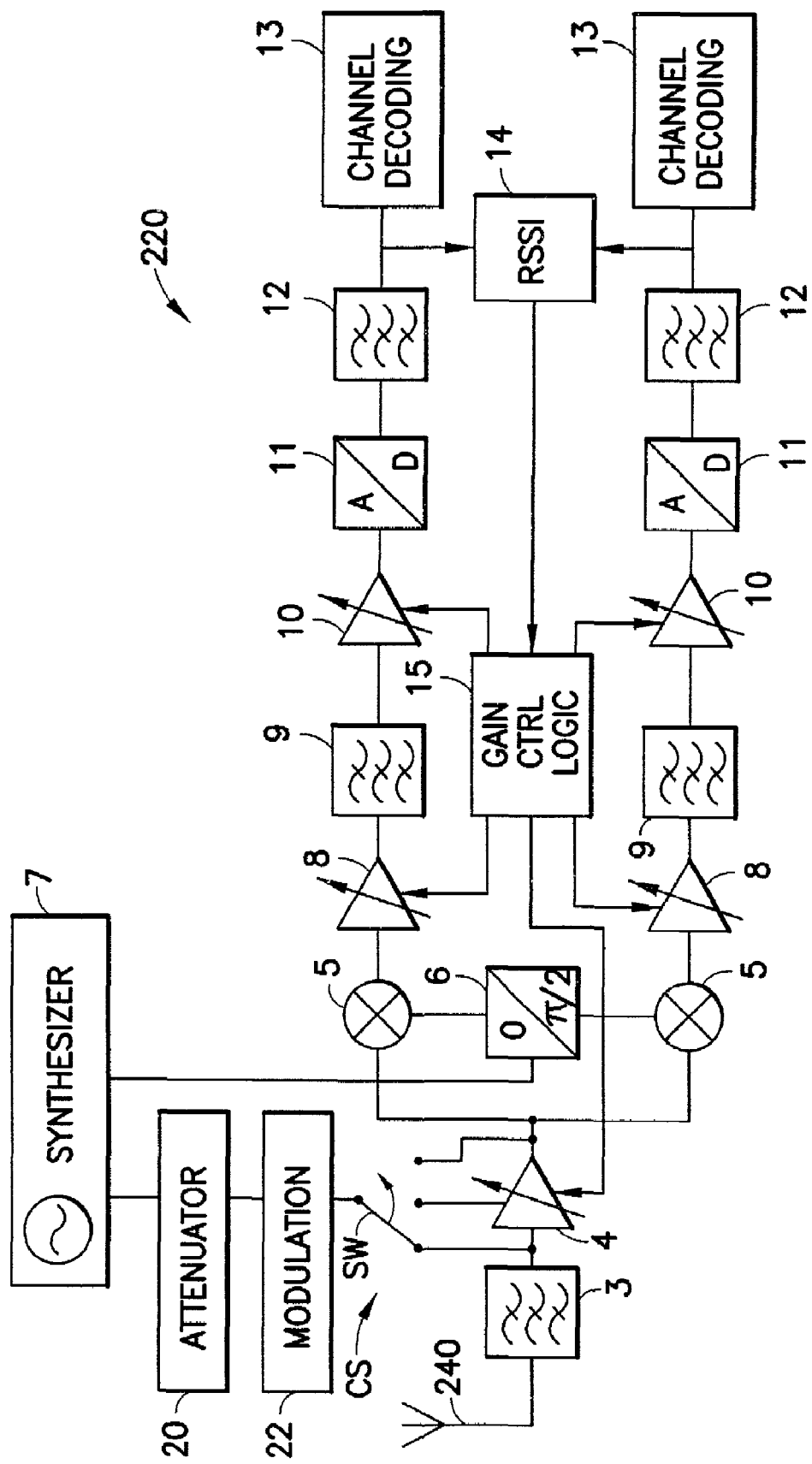
FIG. 4 is a block diagram of a direct conversion receiver having calibration circuitry in accordance with this invention, where the switch indicates possible connection points or nodes of the calibration signal.

Referring to FIG. 4, in accordance with this invention an internally generated test or calibration signal (CS) is connected to the LNA 4 resonator in order to calibrate the receiver 220. The calibration signal can be taken from the synthesizer 7 as shown in FIG. 4, or from an auxiliary oscillator as discussed below. The calibration signal is first attenuated in attenuator 20, as the typical signal levels output by the synthesizer 7 would easily saturate the signal path of the receiver 220. The calibration signal can be located at the same frequency as the LO 6 of the downconversion mixers 5, or at some other frequency. In the case of the direct conversion receiver, as shown in FIG. 4, the former alternative is preferred as the same signal used for the LO 6 can be used as well for the calibration signal CS. However, the calibration signal is preferably modulated by modulation block 22 such that the calibration signal is not located exactly at DC (or as a passband signal in general) after downconversion by mixers 5. This is so because the DC component is typically filtered out, and at least the accuracy of the calibration would suffer from other interferences at DC. The calibration signal CS can be amplitude modulated (AM), phase modulated (PM), frequency modulated (FM), or data modulated. The last alternative (data modulation) implies that the calibration signal is modulated with some known data sequence that can be detected in the receiver 220. The frequency of the modulated calibration signal is preferably located within the passband of the device that is measuring the response. In the preferred mode, the same signal path as the actual reception signal path is used for the calibration, although in other embodiments a separate, parallel signal path could be used. In the case of at least the preferred mode the calibration signal is modulated with a signal that results in the generation of frequency components that fall within the passband of the channel selection filter.

Figure 5:
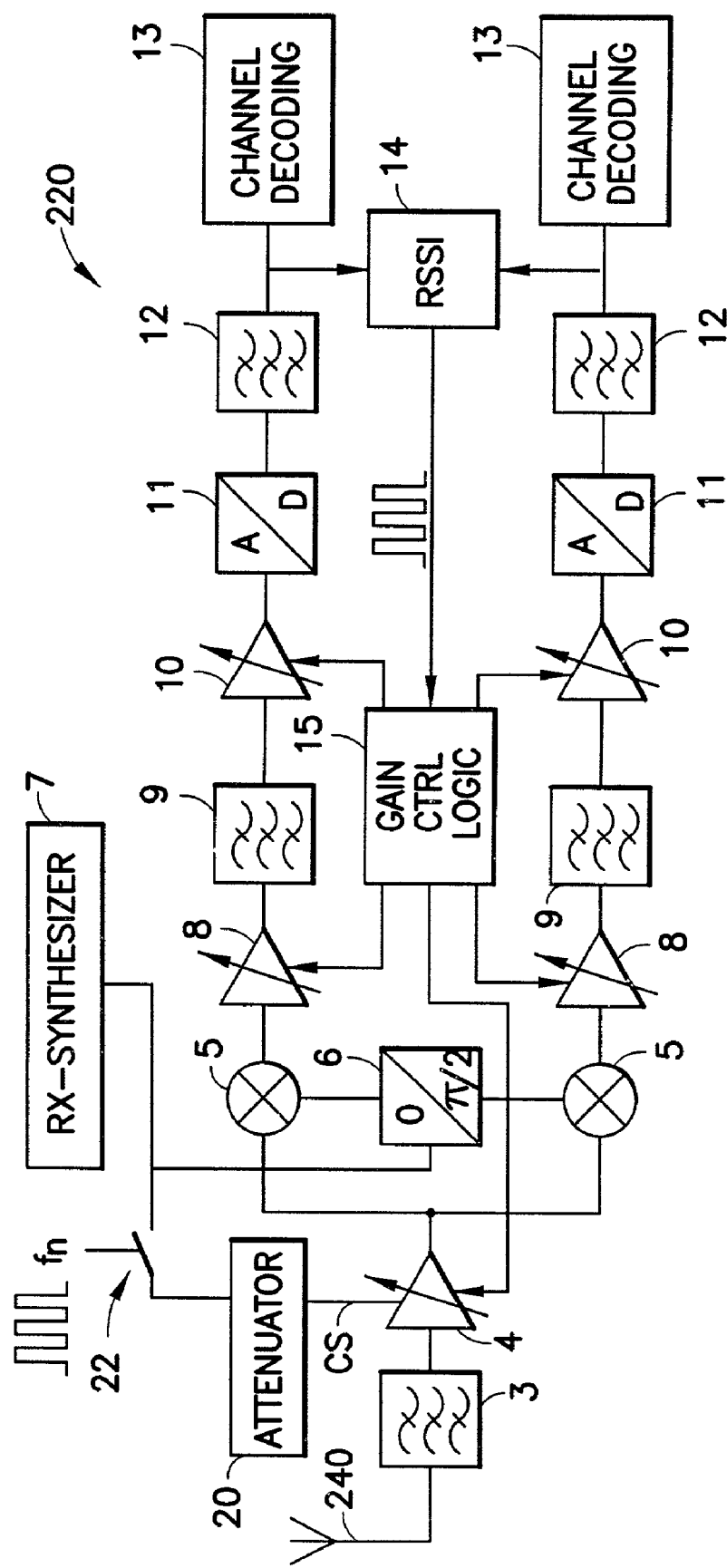
FIG. 5 is a block diagram of the direct conversion receiver having LNA center frequency calibration circuitry using an amplitude modulated (AM) local oscillator (LO) signal in accordance with an aspect of this invention.

A receiver 220 embodiment, according to this invention, that uses an AM modulator 22 is shown in FIG. 5. The AM modulation is formed by switching the LO signal on and off with a digital clock signal of frequency $f_0$. The AM modulated signal is downconverted by the RF mixers 5 so that only frequency $f_0$, having an amplitude proportional to the amplitude of the calibration signal after the LNA 4, is detected by the RSSI block 14 or by some equivalent voltage/current/power detector.

Figure 6:
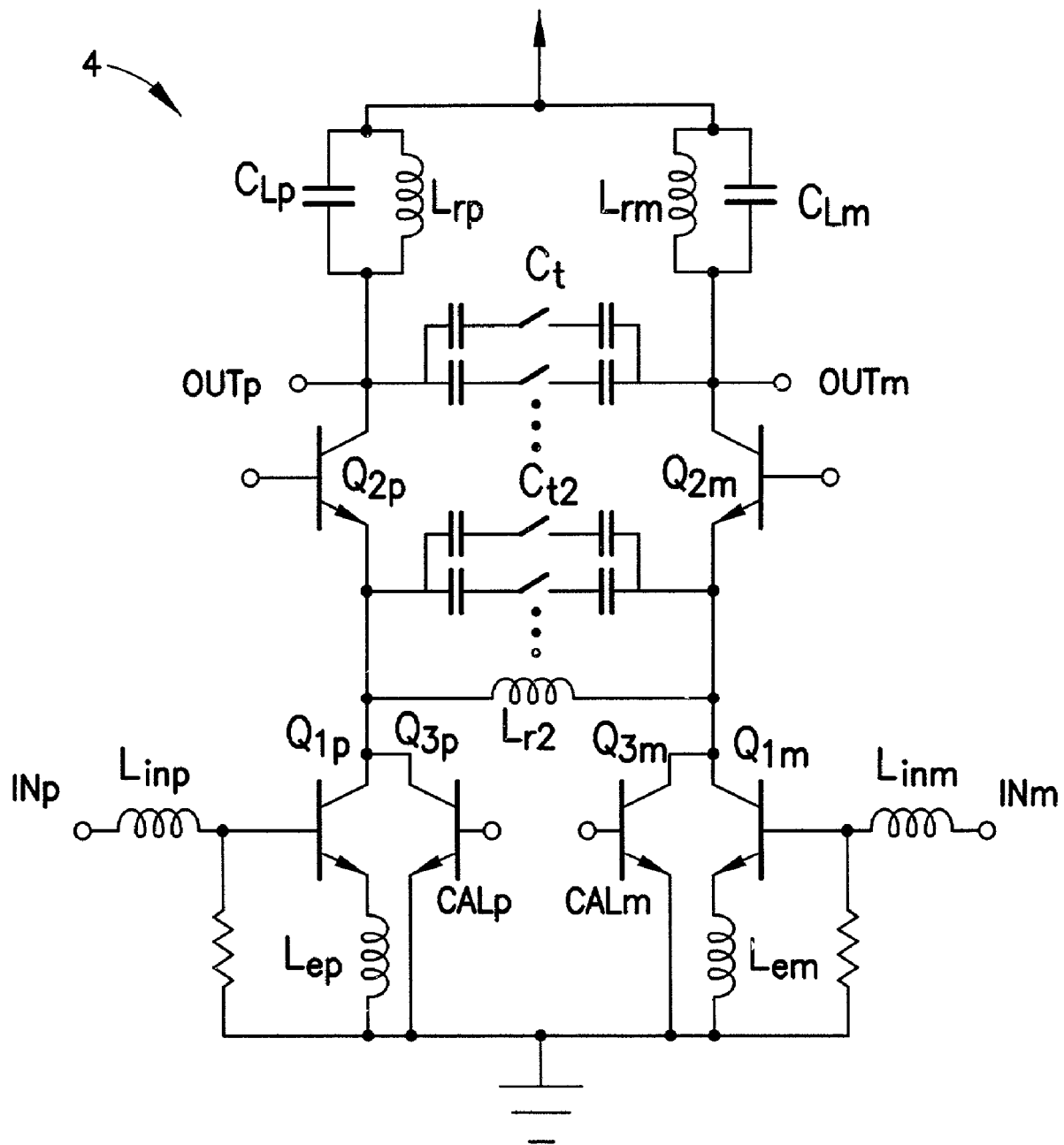
FIG. 6 is a schematic diagram showing one embodiment for coupling the calibration signal to a LNA resonator, where the LNA is in the calibration mode where the input stage is switched off.

FIG. 6 shows one embodiment of the LNA 4 and the connection of the calibration signal (CS) to the LNA resonator. In this embodiment, and contrasting same with the prior art example shown in FIG. 2A, it can be seen that the input transistors $Q_{1P}$ and $Q_{1M}$ are paralleled with calibration signal input ($CAL_p$ and $CAL_m$) transistors $Q_{3p}$ and $Q_{3m}$, respectively. By connecting the calibration signal to the transistors $Q_{3p}$ and $Q_{3m}$, the use of a calibration switch upstream form the LNA 4 is avoided. This is beneficial, as the presence of the calibration switch would increase the complexity and decrease the performance of the receiver 220. Note the two LNA resonators, where the first resonator is comprised of $C_{Lp}$, $L_{rp}$, $C_{Lm}$, $L_{rm}$, $C_t$ (and associated parasitic resistances) and the second resonator is comprised of $L_{r2}$ and $C_{r2}$ (and associated parasitic resistances). $C_t$ and $C_{r2}$ represent switchable tuning capacitors for tuning the resonance frequency of the first and second LNA resonators. The bases of $Q_{2p}$ and $Q_{2m}$ are normally connected to a suitable DC bias source.

In the case of an unmodulated signal, or if the receiver 220 uses some intermediate frequency (IF), the calibration signal is not located at the same frequency as the LO signal. Hence, an additional oscillator is preferred for use. An embodiment that combines the LNA 4 and the VCO for this purpose is described below. However, in the case of IIP2 (or IIP3) trimming the calibration signal (CS) is preferably located outside of the passband of the channel selection filter. That can be done, for example, by using a higher frequency in the modulated signal or preferably, in the case of IIP2, by using the TX local oscillator signal from the synthesizer 7 in FIG. 4. This signal is also strong enough, and typically at a convenient distance from the reception frequency band of interest, that it can be used as a carrier signal for appropriate modulation. An AM component can be also added to the TX signal. The calibration signal (CS) can be fed to the circuit from the input, output or some interstage node of the LNA 4, as shown by the placement of the switch SW in FIG. 4. In addition, the IIP2 calibration can be realized by switching on and off the current source of an additional oscillator (see FIGS. 11 and 12 that are described below), thereby producing a strong AM signal. In this case the downconverted oscillation frequency is outside of the channel selection filter, and the amplitude of the oscillation signal may be controlled by the current source of the oscillator.

Figure 7:
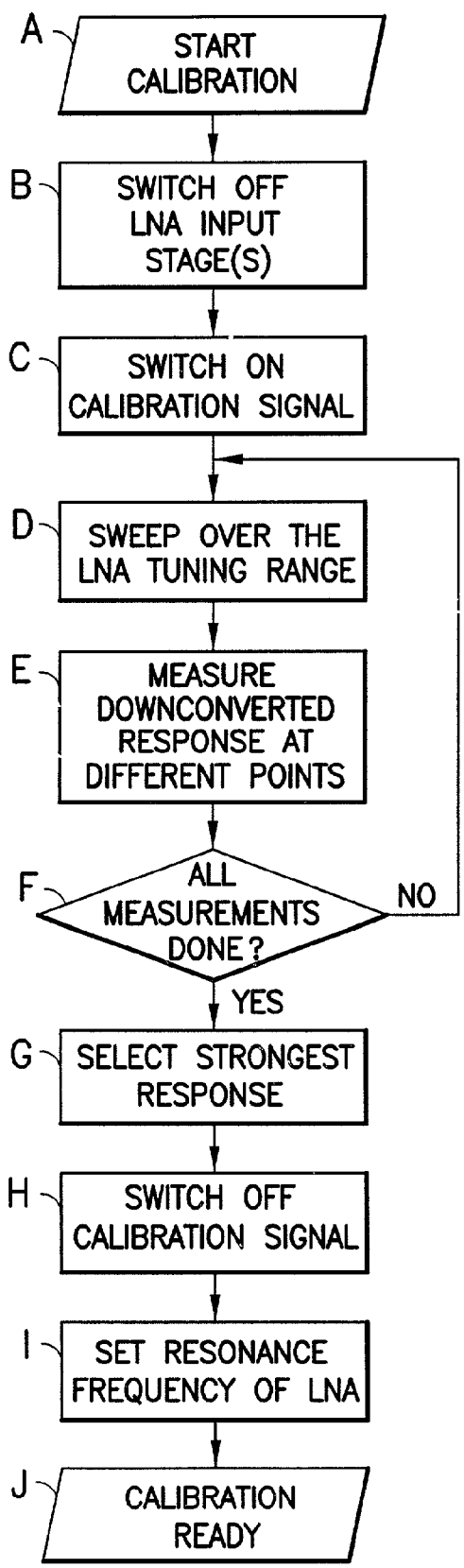
FIG. 7 is a logic flow diagram that illustrates an embodiment of a resonator tuning algorithm.

An embodiment of the calibration algorithm is shown in FIG. 7. In the algorithm the resonator tuning range is swept over the total tuning range and the strongest response that can be measured using the RSSI block 14 of the receiver 220 defines the optimum setting. This configuration can then be stored in the memory 130 for use during reception. Preferably, the resonance tuning is performed at the middle-most radio channel. An important further embodiment provides the possibility to shift the tuning word of the resonator depending on the received radio channel to which the receiver 220 is being tuned. This means that once the process variations are calibrated for, it is possible to change the resonance frequency of the LNA 4 according to the received channel. In WCDMA, this has particular importance if the highest frequency channel centered at 2167.5 MHz is to be received. If the resonance frequency is located at the middle of the band i.e. 2140 MHz, some additional loss for the received channel will exist due to narrow bandwidth LNA 4. However, an additional benefit is realized due to the fact that the attenuation of the TX leakage at 1977.5 MHz will significantly increase due to the shifted resonance. This option is significant in all RF communications systems having a wide bandwidth and full duplex operation.

Discussing FIG. 7 in greater detail, at Step A the calibration procedure is started, and at Step B the LNA input stage(s) are switched off. In the example of FIG. 6 these would be the transistors $Q_{1p}$ and $Q_{1m}$. At Step C the calibration signal (CS) is switched on, and a loop defined by Steps D, E and F is then entered where the frequency of the calibration signal, or the resonator center frequency, or the oscillation frequency of the additional oscillator (see FIGS. 11 and 12) is swept over the LNA 4 tuning range. The downconverted response is measured at several points, and the process is repeated until all measurements are made (and stored in the memory 130.) At Step G the strongest response is selected, the calibration signal is switched off at Step H, and the resonance frequency of the LNA 4 is set accordingly at Step I. At Step J the calibration procedure terminates with the LNA 4 properly calibrated so as to compensate for variations that occur in the passive and other components in the RF IC.

Note that the method can include changing the resonance frequency after calibrating, and during normal operation, based on a current local oscillator frequency. That is, the center frequency of the LNA resonator is changed based on the operational channel. In this manner the rejection of the transmitted signal in frequency division duplex (FDD) systems, such as the WCDMA system, is maximized.

Figure 8:
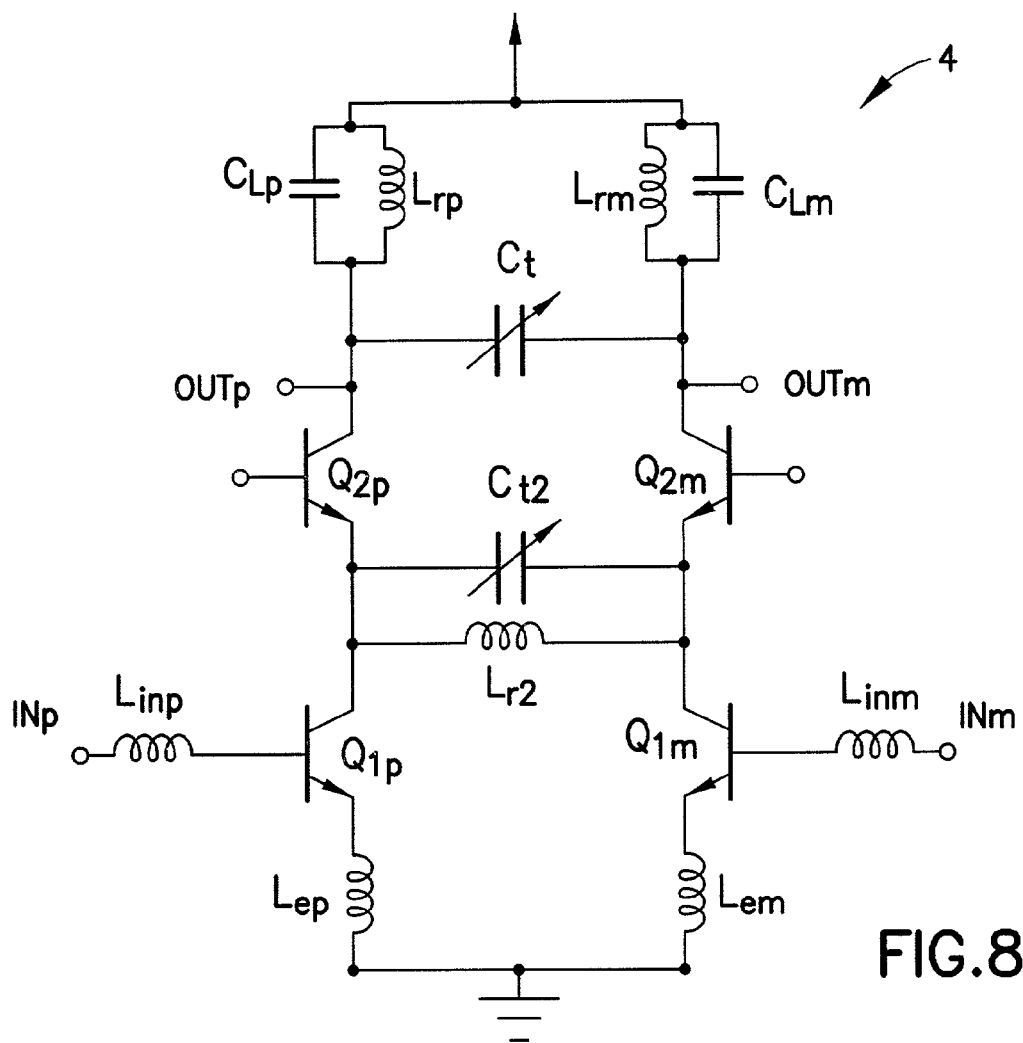
FIG. 8 shows a common emitter LNA with two resonators, and includes variable capacitors that may be, for example, voltage controlled or switched.

Further in accordance with this invention, for the case where the LNA 4 has two resonators, a procedure can be performed to improve the out-of-band attenuation performance and internal linearity. Such a LNA 4 structure is shown in FIGS. 6 and 8. The basic LNA structure is similar in some respects to the one shown in FIG. 2A. However, this improved LNA 4 has a tuning mechanism that includes tunable capacitors $C_t$ and $C_{t2}$, and provides for tuning both the resonance frequency and the supply current. Because both resonators, made up of $C_{Lp}$, $L_{rp}$, $C_{Lm}$, $L_{rm}$, $C_t$ (and associated parasitic resistances) and $L_{r2}$, $C_{t2}$ (and associated parasitic resistances), interact with one another in this topology it is possible to use one capacitor for resonance frequency tuning during the calibration, and the other capacitor to fine tune the resonance when the supply current is varied. The latter option can be used in adaptive receivers, and is of considerable importance in narrow bandwidth LNAs as changes in power supply current are known to also shift the resonance frequency slightly. In the preferred mode, the capacitor $C_t$ is used for coarse tuning during calibration and the capacitor $C_{t2}$ is used for fine tuning when the supply current is changed. However, other functionality of the capacitors $C_t$ and $C_{t2}$ is possible and operable in practice.

Figure 1:
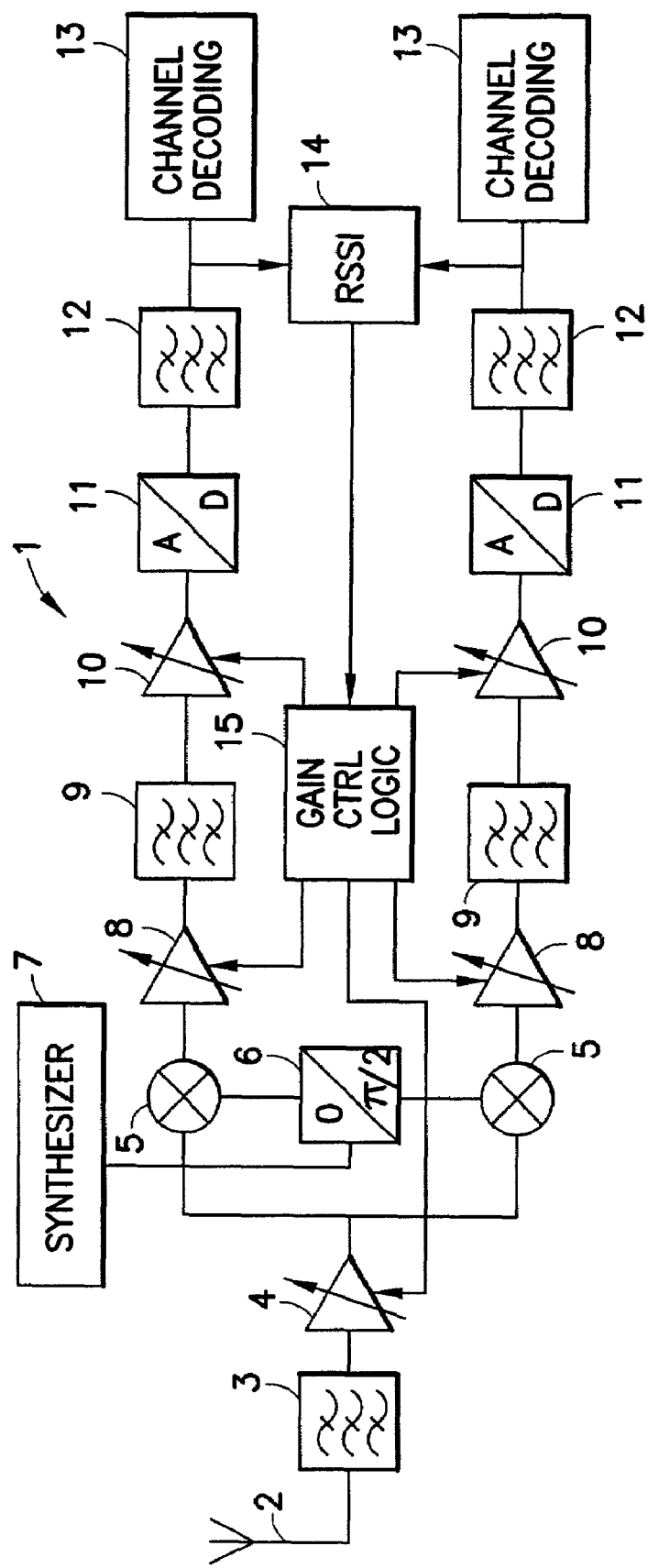
FIG. 1 is a simplified block diagram of a conventional direct conversion receiver.
Figure 2B:
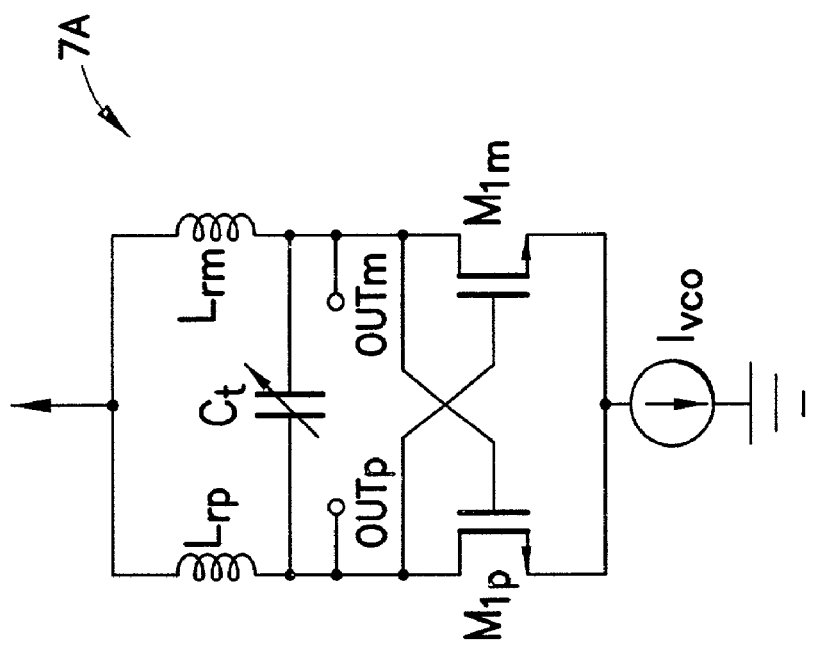
FIGS. 2A and 2B, collectively referred to as FIG. 2, are schematic diagrams of a conventional differential common emitter low noise amplifier (LNA) and a conventional voltage controlled oscillator (VCO), respectively.
Figure 2A:
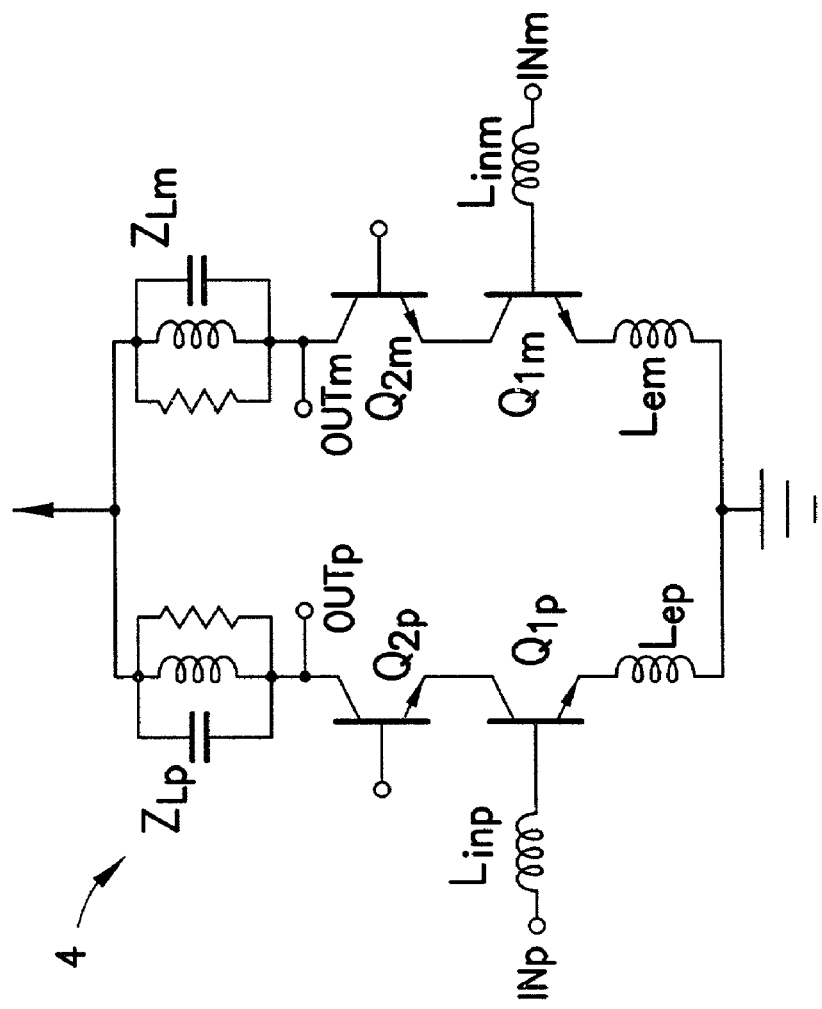

By way of contrast, the conventional single (load) resonator LNA 4 shown in FIG. 2A has a single resonator formed by $Z_{LP}$ and $Z_{LM}$, whereas the two resonators shown in the embodiments of FIGS. 6 and 8 can be tuned separately. The overall transfer function is the combination of the transfer functions of the two resonators.

Figure 9:
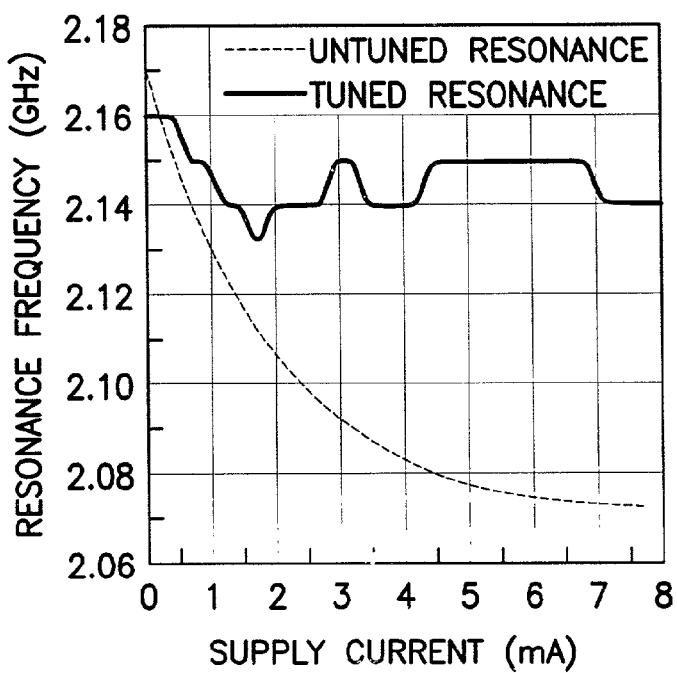
FIG. 9 is a graph that depicts resonance frequency as a function of supply current for the LNA, with and without digital tuning.

FIG. 9 shows the effect of fine-tuning, as a function of power supply current, for the resonance frequency. The resonance frequency can be seen to shift by almost 100 MHz over the supply current range without the use of fine-tuning. With fine tuning, however, the resonance frequency can be maintained to within ±15 MHz, an amount of frequency shift that is acceptable in most applications. The fine tuning the resonance to compensate for variations in power supply current can use predetermined information, or it can performed by executing the calibration procedure at different power supply current levels.

Figure 10:
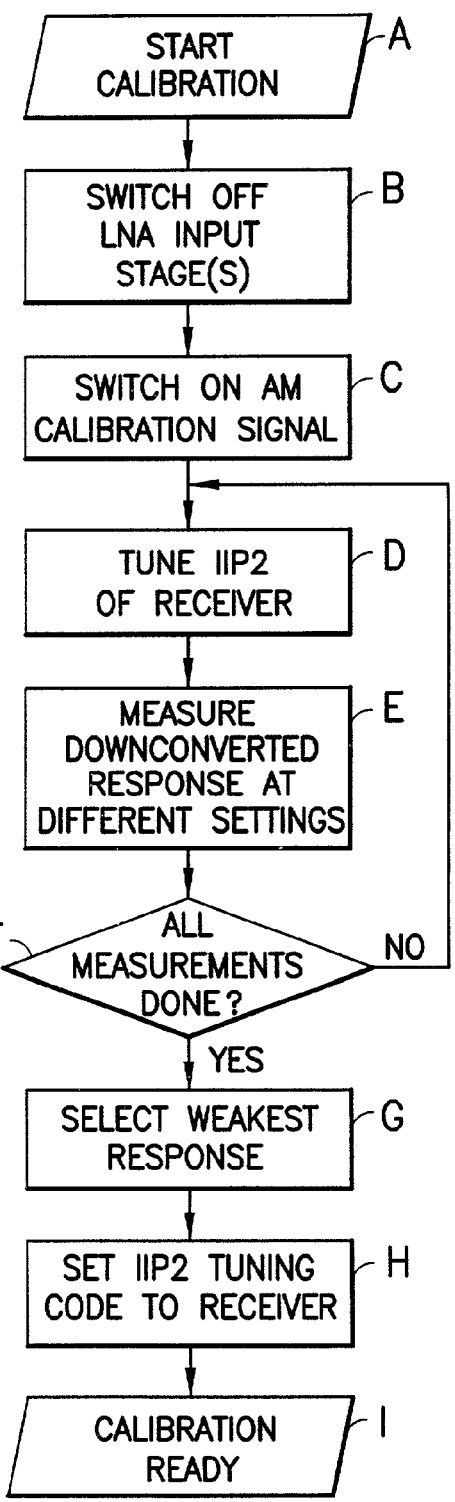
FIG. 10 is a logic flow diagram that illustrates an embodiment of second-order input intercept point (IIP2) calibration of a direct conversion receiver.

FIG. 10 shows the IIP2 calibration algorithm for the direct conversion receiver 220, and may use the calibration arrangement shown in FIG. 4, wherein the modulated signals that are used to tune the IIP2 are outside of the channel selection filter. The main differences as compared to the algorithm for searching for the resonance frequency (FIG. 7) are the use of an amplitude modulated out-of-band signal and the search for the weakest, as opposed to the strongest, response. The latter is due to the fact that the IMD2 product is an unwanted effect.

More particularly, in the receiver 220 the baseband signal processing blocks 8, 9 and 10 have an ideally infinite and a typically very high common-mode-rejection ratio (CMRR), and thus only the signal that is differential can pass through the chain. In principle, the IMD2 product is a common mode signal that can be rejected totally with an infinite CMRR. In practice, the process variations of the mixer 5 and baseband blocks following it will produce a small differential signal that originates from the common mode IMD2 product. This signal is undesirable and can be minimized by using the tuning procedure in accordance with this invention. By tuning the mixer 5 in such a way that the IMD2 products are again common mode, the CMRR of the analog baseband chain can suppress these signals automatically. One advantage of this tuning method is its simplicity, as no additional circuit blocks at the analog baseband side are needed.

If several settings during the tuning cause the smallest response, then the measurement accuracy may not be sufficient. In that case it is possible to increase the measurement accuracy by increasing the signal level of the AM tone, or increasing the gain of the signal path. In the case of signal saturation of the receiver output, the opposite procedure can be performed during calibration. One possible IIP2 tuning technique is described in EP 0951138A1, "Method for reducing envelope distortion in radio receiver" by K. Kivekäs & A. Pärssinen, application date Apr. 18, 2001, incorporated by reference herein in its entirety. The present invention extends the use of those techniques and presents a new calibration algorithm.

Discussing FIG. 10 now in greater detail, at Step A the IIP2 calibration procedure is started, and at Step B the LNA input stage(s) are switched off. At Step C the AM calibration signal (CS) is switched on, as shown in FIG. 4, and the loop defined by Steps D, E and F is then entered where the IIP2 of the receiver 220 is tuned, the downconverted response is measured at different settings, and the process is repeated until all measurements are made. At Step G the weakest response is selected (the AM calibration signal is switched off) and an IIP2 tuning code is sent to the receiver 220 at Step H. At Step I the calibration procedure terminates with the IIP2 properly calibrated.

Figure 11:
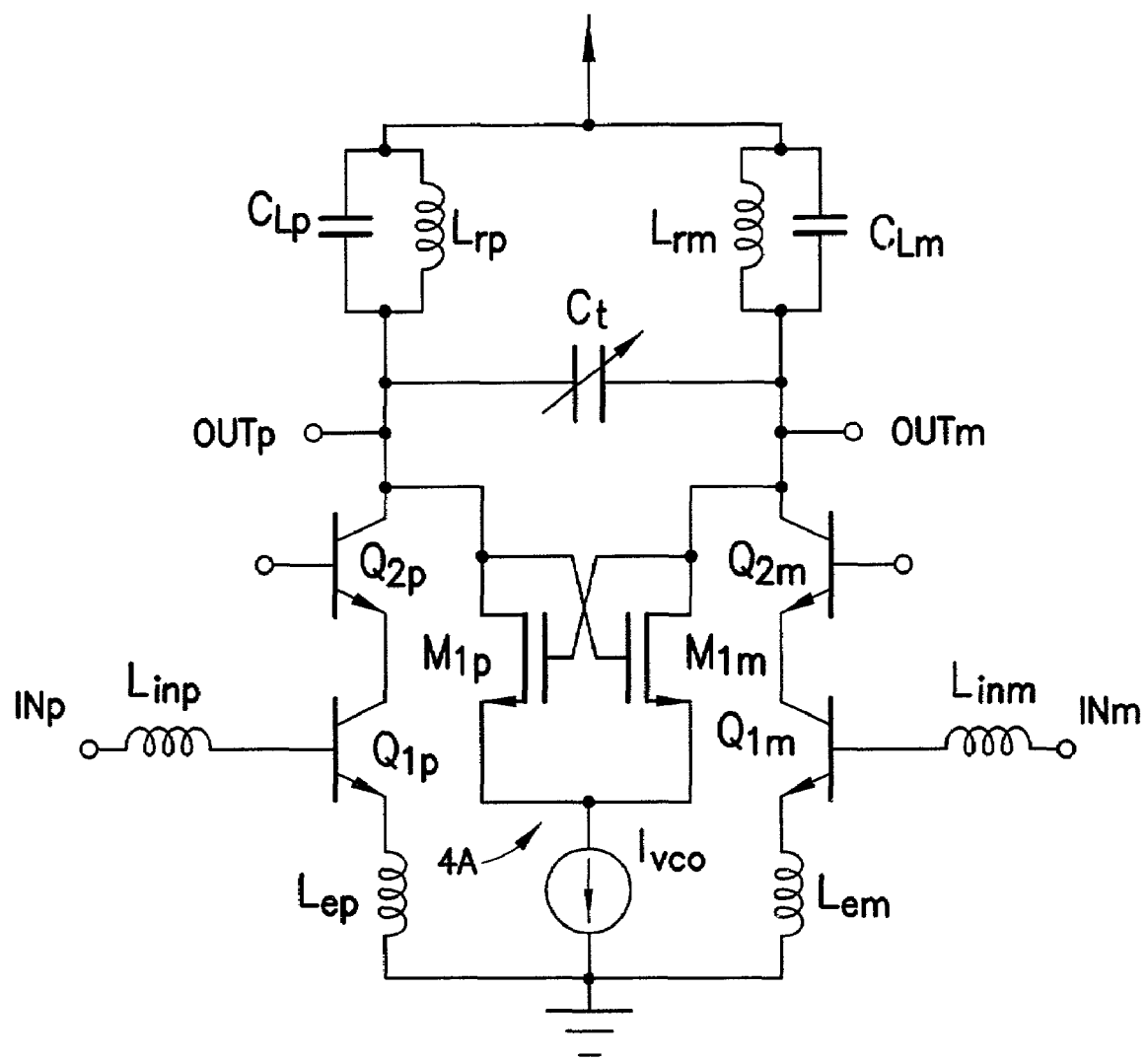
FIG. 11 is a schematic diagram showing an embodiment of an auxiliary VCO coupled to the LNA resonator in accordance with an embodiment of this invention.
Figure 12B:
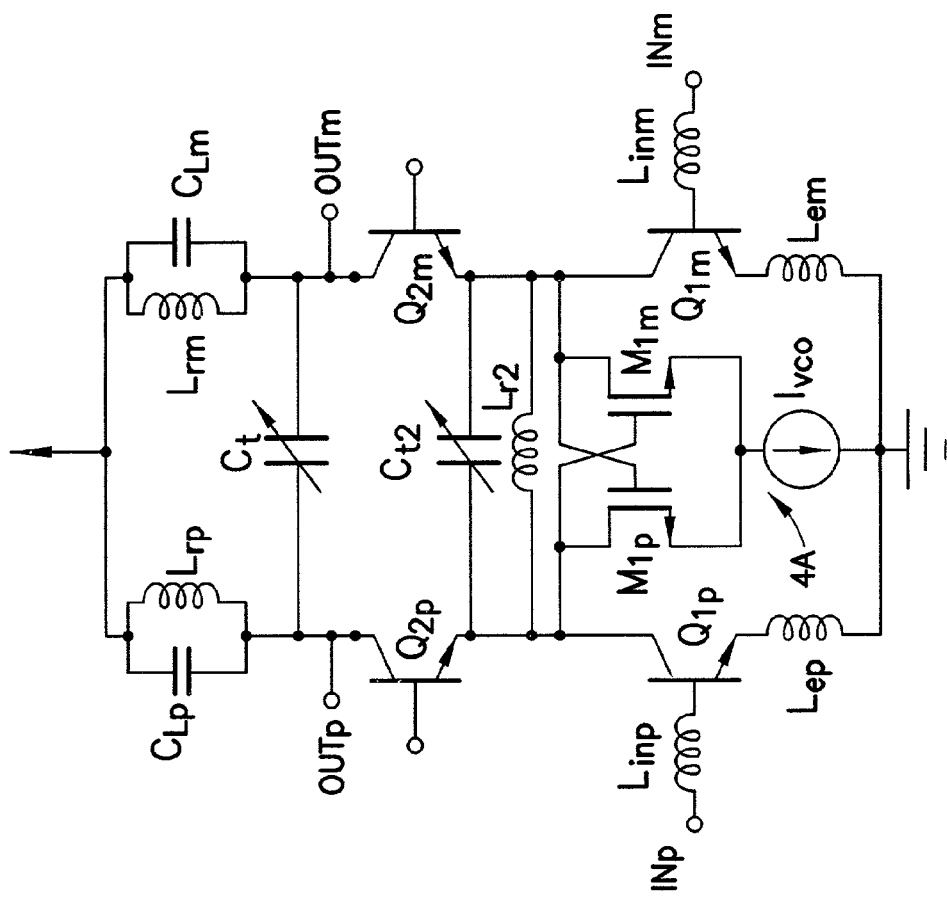
FIGS. 12A and 12B, collectively referred to as FIG. 12, are schematic diagrams of first and second alternative embodiments, respectively, of an auxiliary VCO coupled to the LNA with two resonators.
Figure 12A:
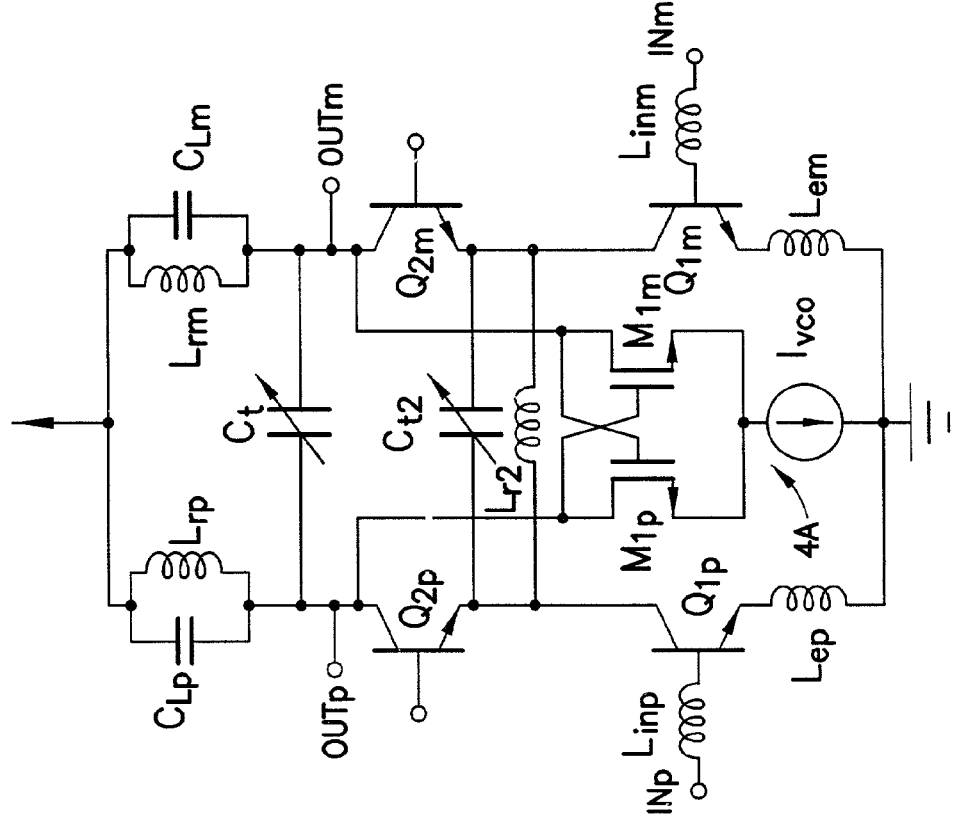
Figure 13:
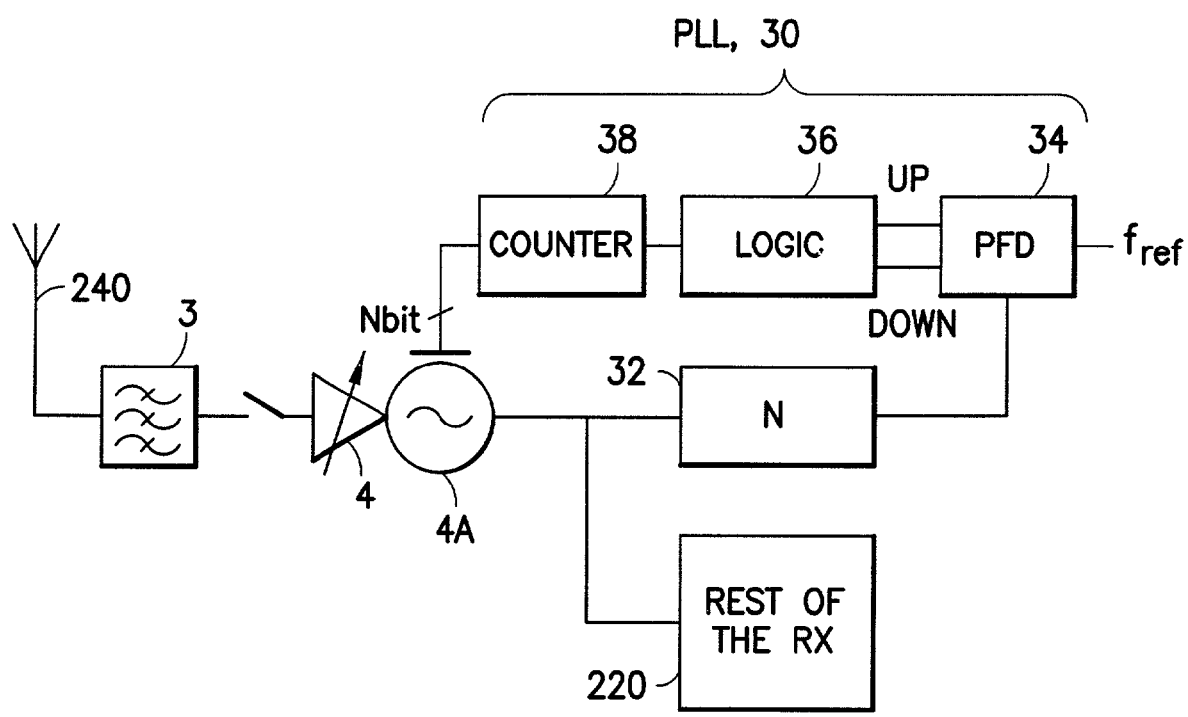
FIG. 13 is a block diagram of an LNA tuning function that uses a frequency divider, phase-frequency detector, counter and associated logic, where the LNA is assumed to be in oscillation with an additional oscillator core.

As was discussed earlier, instead of the synthesizer 7 an additional or auxiliary oscillator, which uses the same resonator as the LNA 4, can be used to generate the calibration signal (CS). FIG. 11 shows a preferred mode of implementation if a single resonator is used, while FIG. 12 shows two different embodiments of the LNA 4 with two resonators. The oscillator 4A uses the same resonator as the LNA 4, and is formed from cross-coupled transistors $M_{1p}$ and $M_{1m}$ and current source $I_{VCO}$. The input stage(s) of the LNA 4 are switched off during the operation of the oscillator. Additionally, and as is shown in FIG. 13, the oscillator 4A can be connected to a phase lock loop (PLL) 30 formed using a divide by N frequency divider 32 that is connected to the output of the LNA 4, a phase detector (PD) 34, logic 36 to tune the capacitor switches of the resonator and a counter 38. This embodiment of the invention can be used for LNA 4 center frequency tuning, as the oscillation frequency of the auxiliary oscillator 4A is the same as the center frequency of the LNA 4.

The logic 36 may operate as follows: the logic 36 counts the up and down pulses of the PDF 34 separately and decides if the signal is lower or higher in frequency than the target frequency by comparing the output of the counters 38. If up counter has a larger count than the down counter, the decision is 'go up' and vice versa. The PLL 30 would thus oscillate between the two tuning words that are both acceptable. Other possibility is to begin from the lowest (or highest) frequency and count the tuning words up (or down) until the state of the phase detector 34 changes. In this case the logic 36 may count up and down pulses. If the system starts from the lowest frequency the result of the calibration is the state where the number of the counted down pulses exceeds the number of counted up pulses. The correct frequency is then one between the last tuning word that does not change the state of the phase detector 34 and the tuning word that does change the state of the phase detector 34. If the resonator includes an analog capacitance the tuning voltage is preferably set into the middle of the analog tuning range. Additionally, this method can be used to tune the local oscillator of the synthesizer 7.

A further, non-limiting embodiment for tuning the VCO is described in a commonly assigned patent application "Self-contained tuning of the VCO center frequency", by Pauli Seppinen and Kalle Asikainen, U.S. patent application Ser. No. 10/024,084, filed 17 Dec. 2001, and incorporated by reference herein. In this approach there is a method for tuning an adjustable oscillator having at least one resonance circuit. The frequency of the oscillator is adjusted by changing the resonance frequency of the resonance circuit by means of a control signal for which a minimum value and a maximum value are selected. In the execution of the method at least one target value is selected for the control signal, the frequency of the adjustable oscillator is adjusted to substantially correspond to the target value, and the value of the control signal and the target value are compared. When the value of the control signal is substantially different from the target value, a tuning signal is produced to change the resonance frequency of the at least one resonance circuit.

The nodes to which the auxiliary oscillator is connected in FIGS. 11 and 12 (collectors of $Q_{2p}$, $Q_{2m}$ or the emitters of $Q_{2p}$, $Q_{2m}$) also illustrate examples of the nodes to which the other calibration signals can be connected in the LNA 4.

The teachings of this invention can be implemented with just a few additional active components including RF transistors, possibly a simple AM modulator (a simple switching device in its basic form, as shown in FIG. 5) and simple logic. While the invention could be implemented using external devices, the most preferred embodiments place the additional RF components on the same die as the RF front end. In any case, the IC area increase is very small. Very simple digital control logic is sufficient in this invention and the logic can be implemented with customized logic on the same die with any of the analog or mixed-mode chip, on the digital ASIC or programmable digital signal processor (DSP 180) or the central processing unit (CPU, such as the MCU 120). The memory requirements are also modest.

The teachings of this invention can be applied to all digital radio systems. On the other hand, the benefits may vary between systems. For example, the use of the narrowband resonator is important in CDMA systems in order to establish the maximum attenuation for the TX leakage. On the other hand, in a GSM system it becomes possible to calibrate IIP2 internally. The feature may relax the calibration requirements during production, and/or it may add the possibility to use adaptivity in the mixers during operation. This is true because the IIP2 can be calibrated at a larger set of test points without adding production cost. This invention is suitable for use in both the mobile station 100 and in the base stations 50.

While described in the context of presently preferred embodiments of this invention, those having skill in the art should appreciate that variations in form and detail may be made, and that all such changes will still fall within the scope of the teachings of this invention. For example, this invention should not be viewed as being limited to the specific LNA circuit embodiments shown in the Figures and described above, nor for use with only specific frequencies, ranges of frequencies, types of receivers, or with only certain wireless communications standards and protocols, such as only with GSM or WCDMA systems.

Furthermore, the calibration can be made during a reception time, instead of during a receiver idle time. In this case, and during a time that the receiver 220 is required, the data processor 120, 180 of the mobile station 100 is operated to enable the LNA 4, as well as for generating the calibration signal within the mobile station 100, coupling the calibration signal into the receiver 220, measuring the downconverted response of the receiver 220 to the calibration signal, and then at least one of tuning the resonance frequency of at least one LNA resonator based on the measured downconverted response, or adjusting the linearity of the receiver chain. In this embodiment the downconverted calibration signal is preferably located outside of a receiver passband transfer function so that the calibration signal is not totally rejected. That is, the downconverted calibration signal is not totally rejected, but is instead rejected or attenuated 20 dB/decade, if the filter or filters (e.g., filters 9 and 12) are first order filters. In this case the calibration signal is attenuated by a known amount as it passes through the receiver chain, and can thus be measured and characterized as described above. In this embodiment the downconverted calibration signal may be separated from the received signal spectrum by bandpass filtering in the digital domain.

What is claimed is:

1. A method for operating a radio frequency RF apparatus for communications equipment, comprising:
   under the control of a data processor of the communications equipment,
   generating a calibration signal;
   injecting the calibration signal into an amplifier of the RF apparatus;
   measuring a downconverted response of the RF apparatus at a plurality of different internal states of the RF apparatus using at least one frequency of the calibration signal; and
   tuning a resonance frequency of at least one resonator based on the measured downconverted response so as to compensate at least for variations in component values that comprise the at least one resonator.

2. A method as in claim 1, where the calibration signal is generated using a frequency synthesizer of the communications equipment.

3. A method as in claim 1, where the calibration signal is generated using an oscillator that comprises said at least one resonator.

4. A method as in claim 1, where the step of tuning a resonance frequency of the at least one resonator comprises also fine tuning the resonance to compensate for variations in power supply current using one of predetermined information or executing the calibration procedure at different power supply current levels.

5. A method as in claim 1, where an output of the amplifier is coupled to an input of a downconversion mixer, and where the step of measuring observes an output of a received signal strength indicator RSSI that is located downstream from the downconversion mixer.

6. A method as in claim 1, where the RF apparatus is a direct conversion receiver, where an output of the amplifier is coupled to an input of a downconversion mixer, and where the calibration signal is modulated so as to avoid the generation of a DC or a passband signal at the output of the downconversion mixer during normal downconversion operation.

7. A method as in claim 1, where generating the calibration signal comprises attenuating the calibration signal.

8. A method as in claim 1, where injecting the calibration signal includes disabling a normal received signal input to the amplifier.

9. A method as in claim 1, where the communications equipment comprises a mobile station that operates in accordance with a TDMA protocol.

10. A method as in claim 1, where the communications equipment comprises a mobile station that operates in accordance with a CDMA protocol.

11. A method as in claim 1, where the RF apparatus comprises a direct conversion receiver, and where the communications equipment comprises a mobile station that operates in accordance with a CDMA protocol.

12. A method as in claim 1, where the communications equipment comprises a base station that operates in accordance with one of a TDMA protocol or a CDMA protocol.

13. A method as in claim 1, and further comprising changing the resonance frequency after calibrating, and during normal operation, based on a current local oscillator frequency.

14. A method as in claim 1, further comprising adjusting, based on the measured downconverted response, linearity of the RF apparatus.

15. A radio frequency RF apparatus of a communications equipment, comprising calibration circuitry that operates under control of a data processor of said communications equipment for calibrating RF circuitry of said communications equipment, said calibration circuitry comprising a source of a RF calibration signal and circuitry for coupling said RF calibration signal to an amplifier of said RF apparatus; said calibration circuitry further comprising circuitry for measuring a downconverted response of said RF apparatus at a plurality of different internal states of said RF apparatus using at least one frequency of the RF calibration signal and for performing tuning a resonance frequency of at least one resonator based on the measured downconverted response so as to compensate at least for variations in component values that comprise said at least one resonator.

16. A RF apparatus as in claim 15, where said calibration signal source comprises a frequency synthesizer of said communications equipment.

17. A RF apparatus as in claim 15, where said calibration signal source comprises an oscillator that in turn comprises said at least one resonator.

18. A RF apparatus as in claim 15, where said circuitry for tuning said resonance frequency also fine tunes said resonance to compensate for variations in power supply current using one of predetermined information or executing the calibration procedure at different power supply current levels.

19. A RF apparatus as in claim 15, and further comprising a modulator for modulating said calibration signal, and where said circuitry for adjusting said linearity of said RF apparatus comprises making an adjustment for either a second order input intercept point IIP2 or a third order input intercept point IIP3.

20. A RF apparatus as in claim 15, where an output of said amplifier is coupled to an input of a downconversion mixer, and where said measuring circuitry observes an output of a received signal strength indicator RSSI that is located downstream from said downconversion mixer.

21. A RF apparatus as in claim 15, where said RF apparatus is a direct conversion receiver, where an output of said amplifier is coupled to an input of a downconversion mixer, and where said calibration signal is modulated to avoid generating a DC signal or a passband at an output of said downconversion mixer during normal downconversion operation.

22. A RF apparatus as in claim 15, where said source comprises an attenuator for attenuating an output of a frequency synthesizer to provide said calibration signal.

23. A RF apparatus as in claim 15, where when said calibration signal is coupled to said amplifier a normal received signal input to said amplifier is disabled.

24. A RF apparatus as in claim 15, where said communications equipment comprises a mobile station that operates in accordance with a TDMA protocol.

25. A RF apparatus as in claim 15, where said communications equipment comprises a mobile station that operates in accordance with a CDMA protocol.

26. A RF apparatus as in claim 15, where said RF apparatus comprises a direct conversion receiver, and where said communications equipment comprises a mobile station that operates in accordance with a CDMA protocol.

27. A RF apparatus as in claim 15, where said communications equipment comprises a base station that operates in accordance with one of a TDMA protocol or a CDMA protocol.

28. A RF apparatus as in claim 15, where said communications equipment changes the resonance frequency after calibrating, and during normal operation, based on a current local oscillator frequency.

29. A RF apparatus as in claim 15, wherein the circuitry for performing tuning further comprises circuitry for adjusting linearity of said RF apparatus based on the measured downconverted response.

30. A method for operating a radio frequency RF apparatus of a communications equipment, comprising:
    under the control of a data processor of the communications equipment,
    generating a fixed calibration signal;
    injecting the fixed calibration signal into an amplifier of the RF apparatus;
    tuning the amplifier to a plurality of different tuning points and measuring a corresponding downconverted response of the RF apparatus; and
    tuning a resonance frequency of at least one resonator based on the measured downconverted response so as to compensate at least for variations in component values that comprise the at least one resonator.

31. A method as in claim 30, where the calibration signal is generated using a frequency synthesizer of the communications equipment.

32. A method as in claim 30, where the calibration signal is generated using an oscillator that comprises said at least one resonator.

33. A method as in claim 30, and further comprising changing the resonance frequency after calibrating, and during normal operation, based on a current local oscillator frequency.

34. A method as in claim 30, further comprising adjusting, based on the measured downconverted response, linearity of said RF apparatus.

35. A method for operating a mobile station comprising, during a time that an RF apparatus is required, operating a data processor of said mobile station for enabling an amplifier in said RF apparatus, generating a calibration signal within said mobile station, coupling said calibration signal into said RF apparatus, measuring a downconverted response of the RF apparatus to said calibration signal, and at least one of tuning a resonance frequency of at least one resonator based on the measured downconverted response.

36. A method as in claim 35, where the downconverted calibration signal is located outside of a receiver passband transfer function so that the calibration signal is not totally rejected.

37. A method as in claim 35, where the downconverted calibration signal is separated from the received signal spectrum by bandpass filtering in the digital domain.

38. A radio frequency RF apparatus of a communications equipment, comprising calibration means that operates under control of a data processor of said communications equipment for calibrating RF circuitry of said communications equipment, said calibration means comprising a means for sourcing a RF calibration signal and means for coupling said RF calibration signal to an amplifier of said RF apparatus; said calibration circuitry further comprising means for measuring a downconverted response of said RF apparatus at a plurality of different internal states of said RF apparatus using at least one frequency of the RF calibration signal and means for tuning a resonance frequency of at least one resonator based on the measured downconverted response so as to compensate at least for variations in component values that comprise said at least one resonator.

39. The RF apparatus of claim 38, wherein the means for measuring a downconverted response further comprises means for tuning the amplifier to a plurality of different tuning points and means for measuring a corresponding downconverted response of the RF apparatus.

40. A RF apparatus as in claim 38, wherein the means for tuning further comprises means for adjusting linearity of said RF apparatus based on the measured downconverted response.

41. A communications equipment comprising:
a memory comprising a program comprising machine-readable instructions; and
a data processor coupled to the memory and coupleable to a radio frequency RF apparatus comprising a source configured to generate a calibration signal, circuitry configurable to coupled the calibration signal to an amplifier, the amplifier, and at least one resonator, the data processor configured to execute the program, the program comprising operations of:
configuring the source to generate a calibration signal;
configuring the circuitry to inject the calibration signal into the amplifier of the RF apparatus;
measuring a downconverted response of the RF apparatus at a plurality of different internal states of the RF apparatus using at least one frequency of the calibration signal; and
tuning a resonance frequency of at least one resonator based on the measured downconverted response so as to compensate at least for variations in component values that comprise the at least one resonator.

42. The communications equipment of claim 41, wherein the operation of measuring a downconverted response further comprises tuning the amplifier to a plurality of different tuning points and measuring a corresponding downconverted response of the RF apparatus.

43. A communications equipment as in claim 41, wherein the program further comprises an operation of adjusting, based on the measured downconverted response, linearity of the RF apparatus.

44. A method for operating a radio frequency RF apparatus for communications equipment, comprising:
under the control of a data processor of the communications equipment,
generating a calibration signal;
injecting the calibration signal into an amplifier of the RF apparatus;
measuring a downconverted response of the RF apparatus at a plurality of different internal states of the RF apparatus using at least one frequency of the calibration signal; and
at least one of tuning a resonance frequency of at least one resonator based on the measured downconverted response so as to compensate at least for variations in component values that comprise the at least one resonator, or adjusting linearity of the RF apparatus, where the resonance frequency is tuned based on a strongest measured downconverted response, and where the linearity is adjusted based on a weakest downconverted response.

45. A method as in claim 44, where generating the calibration signal comprises generating a modulated calibration signal, and where adjusting the linearity of the RF apparatus comprises making an adjustment for either the second order input intercept point IIP2 or the third order input intercept point IIP3.

46. A radio frequency RF apparatus of a communications equipment, comprising calibration circuitry that operates under control of a data processor of said communications equipment for calibrating RF circuitry of said communications equipment, said calibration circuitry comprising a source of a RF calibration signal and circuitry for coupling said RF calibration signal to an amplifier of said RF apparatus; said calibration circuitry further comprising circuitry for measuring a downconverted response of said RF apparatus at a plurality of different internal states of said RF apparatus using at least one frequency of the RF calibration signal and for performing at least one of tuning a resonance frequency of at least one resonator based on the measured downconverted response so as to compensate at least for variations in component values that comprise said at least one resonator, or adjusting linearity of said RF apparatus, where said resonance frequency is capable of being tuned based on a strongest measured downconverted response, and where said linearity is capable of being adjusted based on a weakest downconverted response.

47. A RF apparatus as in claim 46, and further comprising a modulator for modulating said calibration signal, and where said circuitry for adjusting said linearity of said RF apparatus comprises making an adjustment for either a second order input intercept point IIP2 or a third order input intercept point IIP3.

48. A method for operating a radio frequency RF apparatus of a communications equipment, comprising:
under the control of a data processor of the communications equipment,
generating a fixed calibration signal;
injecting the fixed calibration signal into an amplifier of the RF apparatus;
tuning the amplifier to a plurality of different tuning points and measuring a corresponding downconverted response of the RF apparatus; and
at least one of tuning a resonance frequency of at least one resonator based on the measured downconverted response so as to compensate at least for variations in component values that comprise the at least one resonator, or adjusting the linearity of the RF apparatus, where the resonance frequency is tuned based on a strongest measured downconverted response, and where the linearity is adjusted based on a weakest downconverted response.

* * * * *